United States Patent
Avenel et al.

(10) Patent No.: US 12,341,826 B2
(45) Date of Patent: Jun. 24, 2025

(54) PROTECTED DATA COLLECTION NETWORK

(71) Applicant: Orange, Issy-les-Moulineaux (FR)

(72) Inventors: Loic Avenel, Chatillon (FR); Régis Esnault, Chatillon (FR); Jean-Yves Lancien, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 0 days.

(21) Appl. No.: 17/204,736

(22) Filed: Mar. 17, 2021

(65) Prior Publication Data

US 2021/0297459 A1 Sep. 23, 2021

(30) Foreign Application Priority Data

Mar. 18, 2020 (FR) ..................................... 2002633

(51) Int. Cl.
*H04L 9/40* (2022.01)
*H04L 12/28* (2006.01)

(52) U.S. Cl.
CPC .......... *H04L 63/308* (2013.01); *H04L 12/283* (2013.01)

(58) Field of Classification Search
CPC ............................. H04L 63/308; H04L 12/283
See application file for complete search history.

(56) References Cited

U.S. PATENT DOCUMENTS

| | | | |
|---|---|---|---|
| 9,473,300 B2 | 10/2016 | Coleman et al. | |
| 2004/0184415 A1* | 9/2004 | Groell | G08C 23/04 370/277 |
| 2016/0366096 A1* | 12/2016 | Gilde | H04L 41/28 |
| 2017/0359417 A1* | 12/2017 | Chen | H04W 60/04 |
| 2018/0113442 A1 | 4/2018 | Nixon et al. | |
| 2018/0115516 A1* | 4/2018 | Rotvold | H04L 63/0209 |
| 2020/0120071 A1* | 4/2020 | Wimmer | H04L 63/164 |
| 2020/0218240 A1* | 7/2020 | Håkansson | G06F 3/0482 |
| 2021/0021578 A1* | 1/2021 | Falk | H04L 63/0428 |
| 2021/0092173 A1* | 3/2021 | Nixon | H04L 67/12 |
| 2021/0092780 A1* | 3/2021 | Shiers | H04Q 9/00 |
| 2021/0176306 A1* | 6/2021 | Robl | H04L 63/0428 |

FOREIGN PATENT DOCUMENTS

EP 3402132 A1 11/2018

OTHER PUBLICATIONS

Preliminary Search Report for French Application No. 2002633.

* cited by examiner

*Primary Examiner* — Boris D Grijalva Lobos
*Assistant Examiner* — Timothy Sowa
(74) *Attorney, Agent, or Firm* — Knobbe, Martens, Olson & Bear, LLP

(57) ABSTRACT

A data collection network is disclosed. The network includes a plurality of devices and a collection apparatus suitable for collecting data generated by the devices. The network further includes a plurality of data-diode-type equipment items respectively associated with the devices, each device being connected to the collection apparatus via the associated data-diode-type equipment item. Each data-diode-type equipment item is arranged to render unidirectional the connection between the associated device and the collection apparatus, in the direction from the device towards the collection apparatus. Such a network thus makes it possible, in the event of an intrusion into one of the devices or into the collection apparatus, to prevent the intrusion from spreading to other devices.

17 Claims, 1 Drawing Sheet

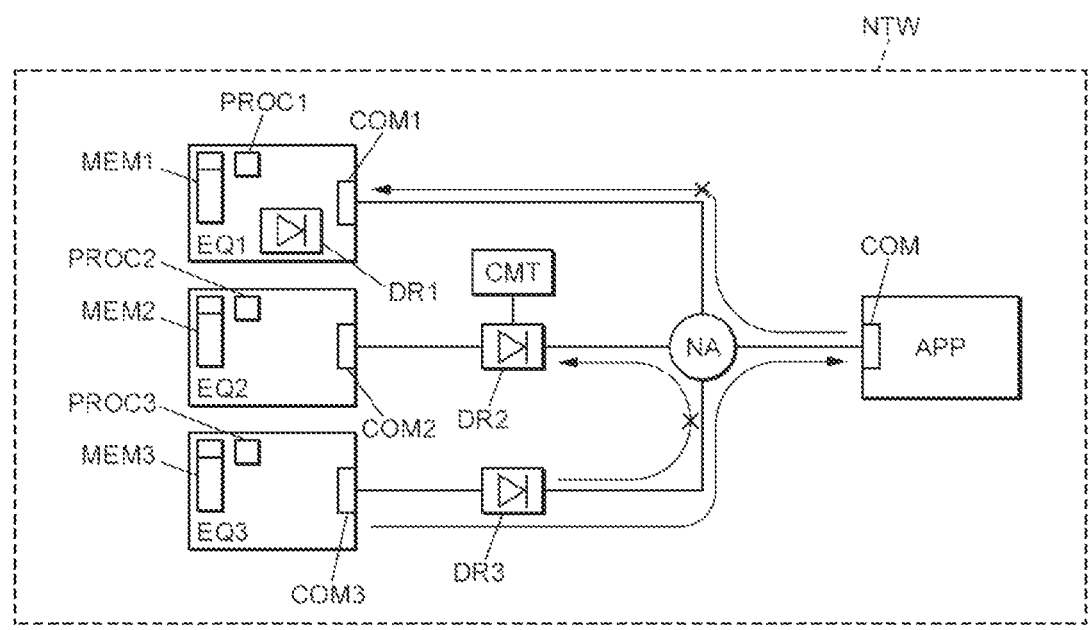

PROTECTED DATA COLLECTION NETWORK

CROSS-REFERENCE TO RELATED APPLICATIONS

This application claims foreign priority to FR 2002633, filed Mar. 18, 2020, the contents of which are incorporated by reference herein in its entirety.

BACKGROUND

Field

The field of the invention relates to protecting a data collection network.

Description of the Related Technology

The invention falls within the context of a network, in particular a computer network, for collecting data, namely a network having an architecture in which several devices are connected to an apparatus for collecting data generated by these devices.

Such an architecture may for example be a local area network, in particular a home network connecting household appliances, meters, connected objects (in particular any connected device located in an individual's home), or may be part of a computer system for accessing a network such as the Internet within an individual's home, a local area network using serial links implementing in particular the CAN communication protocol (acronym for Controller Area Network) used in particular for automobiles. But this architecture is also found in an industrial context regardless of the communication protocol used (Internet, CAN, etc.), in particular in a production plant or a factory, to connect industrial devices such as machine tools, connected robots, portable devices of the Internet of Things, automated guided vehicles known as AGVs, etc.

Typically, the data generated by the devices and then collected by the collection apparatus correspond to files listing the events that have affected the devices and the computer network. Such a file, also called a log file or more simply a log, allows the collection apparatus to establish a history of the events of the computer network. In addition, the data may also relate to an alert in the event of a problem or malfunction in a device of the computer network. Finally, the data may also relate to measurements or a remote reading of a device.

However, the architecture of a data collection network entails an interconnection between the various devices and the collection apparatus, such that in the event of intrusion into one of the devices, there is a high risk that this intrusion extends to other devices and to the collection apparatus. Similarly, an intrusion into the collection apparatus can spread to the devices. Such an architecture thus facilitates the propagation of a computer virus, malicious software (better known under the term "malware"), or autonomous infection mechanisms within the computer network.

The prospect of such intrusions poses a threat:
- to the preservation and protection of confidential information, whether personal data in the case of a home network, or, at the industrial level, trade secrets relating to an operating process of one or more devices or a manufacturing process for a product;
- to the normal operation of a production line in a factory, of a connected vehicle, of a home automation network, etc.

SUMMARY OF CERTAIN INVENTIVE ASPECTS

The invention improves the situation.

To this end, the invention relates to a data collection network comprising: at least one device, and a collection apparatus suitable for collecting data generated by said at least one device.

The network is characterized in that it further comprises at least one data-diode-type equipment item respectively associated with said at least one device, the device being connected to the collection apparatus via the associated data-diode-type equipment item, the data-diode-type equipment item being arranged to render unidirectional the connection between the device and the collection apparatus, in the direction from the device towards the collection apparatus.

Typically, the network comprises a plurality of devices and a plurality of data-diode-type equipment items, at least one device among the plurality of devices being connected to the collection apparatus via at least one among the plurality of data-diode-type equipment items.

Advantageously, a data-diode-type equipment item is associated with each device such that each device is connected to the collection apparatus via the associated data-diode-type equipment item.

In one or more embodiments, the network further comprises an aggregation node connected to each device via the data-diode-type equipment item associated with said device. The aggregation node is suitable for aggregating the data generated by the devices, the collection apparatus being suitable for collecting the data once the data have been aggregated by the aggregation node.

For example, a data-diode-type equipment item associated with a device is installed within said device.

For example, a data-diode-type equipment item associated with a device is installed in the network externally to said device.

In one or more embodiments, the network further comprises at least one switch configured to selectively activate or deactivate at least one data-diode-type equipment item in order to be able to reestablish, if necessary, a bidirectional connection between the device associated with said data-diode-type equipment item and the collection apparatus.

For example, the network is at least partly a wired network.

For example, the network is at least partly a wireless network.

In one or more embodiments, at least one device is a machine tool.

In one or more embodiments, at least one data-diode-type equipment item comprises a photocoupler unidirectionally connecting two controllers.

In one or more embodiments, an operating process of one or more devices or a process for manufacturing a product by one or more devices is characterized by a set of information distributed across devices among the plurality of devices.

The invention also relates to a device installed within a data collection network comprising a collection apparatus. The device is connected to the collection apparatus via a data-diode-type equipment item associated with the device, the data-diode-type equipment item being arranged to render unidirectional the connection between the device and the collection apparatus, in the direction from the device towards the collection apparatus.

In one or more embodiments, the device comprises the associated data-diode-type equipment item.

Finally, the invention relates to an equipment item capable of receiving data generated by at least one device of a data collection network associated with at least one data-diode-type equipment item, the data collection network comprising a collection apparatus. The equipment item capable of receiving data is connected to said at least one device via said at least one data-diode-type equipment item, the data-diode-type equipment item being arranged to render unidirectional the connection between the device and the collection apparatus, in the direction from the device towards the collection apparatus.

In one or more embodiments, the equipment item comprises at least one aggregation node suitable for aggregating the data generated by the devices, the collection apparatus being suitable for collecting the data once they have been aggregated by the aggregation node.

BRIEF DESCRIPTION OF THE DRAWINGS

Other features, details and advantages will become apparent from reading the following detailed description and from analyzing the accompanying drawing, in which:

FIG. 1 illustrates a data collection network according to the invention.

DETAILED DESCRIPTION OF CERTAIN ILLUSTRATIVE EMBODIMENTS

FIG. 1 illustrates a data collection network, hereinafter the network NTW.

The network NTW has an architecture in which devices are connected to an apparatus for collecting data generated by these devices. The network NTW is for example a data collection network.

The network NTW comprises a plurality of devices, here three devices EQ1, EQ2, EQ3, a collection apparatus APP, an aggregation node NA, a plurality of data-diode-type equipment items, here three data-diode-type equipment items DR1, DR2, DR3, and a switch CMT.

The network NTW may be at least partly a wired network. "At least partly a wired network" is understood to mean that at least two entities of the network NTW, where entity can designate a device among the plurality of devices, the collection apparatus APP, the aggregation node NA, or the switch CMT, are connected to each other by a wired link.

Furthermore, the network NTW may be at least partly a wireless network. "At least partly a wireless network" is understood to mean that at least two entities of the network NTW are connected to each other by a wireless link.

As explained in the section dedicated to the prior art, the architecture of the network NTW can be that of a LAN network, such as a home network, a network of a vehicle, or a network in an industrial context.

When the network NTW is a home network, the devices of the plurality of devices can be household appliances, meters, or part of a computer system for accessing a network such as the Internet within an individual's home. Thus, in the context of a home network, the devices may be for example an electricity meter, a residential gateway (also called "Internet gateway"), a mixer or food processor, or a connected washing machine.

For example, device EQ1 is an electricity meter, device EQ2 is a residential gateway, and device EQ3 is a food processor.

When the network NTW is a network in an industrial context, for example in a production plant or in a factory, the devices are industrial devices such as machine tools.

In the context of the invention, during operation the devices of the plurality of devices generate data intended to be collected by the collection apparatus APP. Such data correspond for example to files listing events which have affected the devices and the network NTW. Such a file, commonly known as a log file or log, allows the collection apparatus APP to establish a history of events in the network NTW.

The data may also relate to an alert in the event of a problem or malfunction at one of the devices of the network NTW. Finally, the data may also relate to measurements or a remote reading of a device.

For example, in a residential context, if device EQ1 is an electricity meter, device EQ1 is suitable for generating data relating to electricity consumption of the home or to the time slots corresponding to peak hours and off-peak hours. If device EQ2 is a residential gateway, device EQ2 is suitable for generating data relating to the upload speed, download speed, or Internet consumption. Finally, if device EQ3 is a food processor, device EQ3 is suitable for generating data relating to frequency of use or a recent update. Such data are able to be transmitted, via the network NTW, to the collection apparatus APP.

In an industrial context, the data generated by industrial devices relates for example to electricity consumption, Internet access for connected devices, a recent update, for example implemented remotely by the manufacturer, or measurements of parameters characterizing the operation of industrial devices and providing information about production.

As illustrated in FIG. 1, each device among the plurality of devices comprises at least a memory, a processor, and a communication module. Thus, in the example illustrated here, device EQ1 comprises a memory MEM1, a processor PROC1, and a communication module COM1, device EQ2 comprises a memory MEM2, a processor PROC2, and a communication module COM2, and device EQ3 comprises a memory MEM3, a processor PROC3, and a communication module COM3.

The memory of a device is configured to store instructions of a computer program which when executed by the processor results in the operation of the device.

The memory of a device may also store some or all of the data generated by the device, whether or not these data are intended to be collected by the collection apparatus APP.

The memory may also be configured to store information characterizing an operating process of one or more devices or a process for manufacturing a product. In an industrial context, the term used in particular is "trade secrets". Typically, the information relating to trade secrets can be distributed across devices among the plurality of devices. For example, in the case described here, some of the information relating to trade secrets can be stored in memory MEM1 of device EQ1, some of the information relating to trade secrets can be stored in memory MEM2 of device EQ2, and some of the information relating to trade secrets can be stored in memory MEM3 of device EQ3.

A device's communication module is configured to allow the device to communicate with at least one other entity of the network NTW. In particular, in the context of the invention, the communication module of a device is configured to send the data generated by this device to the collection apparatus APP. In the embodiment illustrated in FIG. 1, in which the network NTW further comprises an aggregation node NA, it is understood that the communication module of a device is then configured to send the data generated by the device to the aggregation node NA.

As explained above, the network NTW can be at least partly wired and/or at least partly wireless. It is understood here that, in the plurality of devices, the communication module may differ in nature from one device to another.

In general, the invention can be used in many types of bidirectional communication networks, for example such as cellular or non-cellular radio communication networks, and depending on the embodiment, the communication module of a device may integrate one or more communication sub-modules, for example for radio frequency communication and configured for the transmission and reception of radio frequency signals, according to one or more technologies such as TDMA, FDMA, OFDMA, CDMA, or one or more radiocommunication standards such as GSM, EDGE, CDMA, UMTS, HSPA, LTE®, LTE-A, WiFi® (IEEE 802.11) and WiMAX® (IEEE 802.16), or their variants or evolutions currently known or subsequently developed. A device may also communicate with other entities in the network NTW using power line communication technology (known by the acronym PLC) if some or all of the network NTW is a power grid.

The collection apparatus APP is suitable for collecting data generated by the devices.

As explained above, the data generated by the devices are typically files, or logs, listing the events that have affected the devices and the network NTW. The collection apparatus APP is then suitable for establishing a history of events of the network NTW, on the basis of the logs received.

The collection apparatus APP may also be configured to update such a history of events when the collected data relate to an alert in the event of a problem or malfunction in a device of the network NTW or when the data relate to measurements or a remote reading of a device.

Industrially, the data collected by the collection apparatus APP may also be used to compile detailed statistics about a plant's production or about energy consumption. The collection apparatus APP may also provide information about the performance and efficiency of the devices.

The collection apparatus APP comprises a communication module COM.

The communication module COM is configured to allow the collection apparatus APP to communicate with the devices of the plurality of devices of the network NTW. In particular, the communication module COM is configured to receive the data generated by the devices and sent by the respective communication modules of the devices. In the embodiment illustrated in FIG. 1, in which the network NTW further comprises an aggregation node NA, it is understood that the communication module COM is then configured to receive the data aggregated by the aggregation node NA.

The above considerations concerning the respective communication modules of the devices, and in particular the different types of data communication networks, also apply of course to the communication module COM of the collection apparatus APP.

In the embodiment illustrated in FIG. 1, the network NTW comprises an aggregation node NA.

The aggregation node NA is connected to each device among the plurality of devices. The aggregation node NA is suitable for receiving and aggregating the data generated by the devices. The aggregation node may further be suitable for transmitting the data aggregated in this manner, to the collection apparatus APP.

The aggregation node NA can, for example, prevent the collection apparatus from continuously receiving the data generated by the devices. The aggregation node NA can thus be suitable for aggregating the data received over a period of time and then transferring at regular time intervals the data thus aggregated.

A data-diode-type equipment item is arranged to render unidirectional a bidirectional connection. For simplicity, in the remainder of the description, the data-diode-type equipment item is called "data diode". However, it is understood here that "data-diode-type equipment item" generally designates any device having the primary functionality of a data diode, namely the conversion of a bidirectional connection into a unidirectional connection.

The network NTW comprises a plurality of data diodes. Each data diode is associated with a device so that there are as many data diodes as there are devices within the network NTW.

In the embodiment illustrated in FIG. 1, the plurality of data diodes comprises three data diodes DR1, DR2, DR3. Each of these data diodes is associated with a device among the plurality of devices, such that data diode DR1 is associated with device EQ1, data diode DR2 is associated with device EQ2, and data diode DR3 is associated with device EQ3.

In the absence of a data diode, the connection between a device and the collection apparatus APP is bidirectional. In other words, data and information can just as easily be transmitted by a device to the collection apparatus AP as the reverse case. Similarly, again in the absence of a data diode and when the network NTW comprises an aggregation node NA, data and information can just as easily be transmitted by a device to the aggregation node NA as the reverse case.

In contrast, within the scope of the invention, the network NTW comprises a plurality of data diodes such that each device is connected to the collection apparatus APP via the data diode with which it is associated.

The connection between a device and the collection apparatus APP is thus unidirectional and no longer bidirectional. The data diode associated with a device is arranged so that the only authorized direction of communication is the direction going from the device to the collection apparatus. In other words, the data diode associated with a device is arranged so that data generated by the device can be transmitted from the device in question to the collection apparatus. However, data cannot be transmitted from the collection apparatus to a device. Similarly, data cannot be transmitted from one device to another device.

Similarly, in the case where the network NTW comprises an aggregation node NA, each device among the plurality of devices is connected to the aggregation node NA via the data diode with which the device in question is associated. The considerations are then similar: a device can transmit data to the aggregation node NA, but the latter cannot transmit data to a device. Here again, two devices cannot communicate with each other because such a communication necessarily involves going through the aggregation node NA, which cannot transmit data to a device.

These different aspects concerning the communications allowed and those made impossible by the use of data diodes are illustrated in FIG. 1 using arrows.

Thus, as an example, communication module COM3 of device EQ3 can transmit data, via the network diode DR3 associated with device EQ3, to the aggregation node NA.

The aggregation node can then aggregate the received data originating from device EQ3 with other received data originating from other devices, here devices EQ1 and EQ2, then transmit these data to the collection apparatus APP. This possible direction of communication is illustrated by the arrow pointing from device EQ3 to the collection apparatus APP.

Still as an example, the communication module COM of the collection apparatus APP can transmit data to the aggregation node NA. On the other hand, the data thus received by the aggregation node NA originating from the collection apparatus APP cannot be transmitted to device EQ1, and more precisely to communication module COM1. This is because data diode DR1 renders unidirectional the connection between device EQ1 and the aggregation node NA, in the direction from device EQ1 to the aggregation node NA. The communication direction from the collection apparatus APP to device EQ1 made impossible by the presence of data diode DR1 is illustrated by the crossed out arrow pointing from the collection apparatus APP to device EQ1.

Finally, still with reference to FIG. 1, communication module COM3 of device EQ3 can transmit data, via data diode DR3 associated with device EQ3, to the aggregation node NA. On the other hand, the data thus received by the aggregation node NA originating from device EQ3 cannot be transmitted to device EQ2, and more precisely to communication module COM2. This is because data diode DR2 renders unidirectional the connection between device EQ2 and the aggregation node NA, in the direction from device EQ2 to the aggregation node NA. This direction of communication from device EQ3 to device EQ2 made impossible by the presence of data diode DR2 is illustrated by the crossed out arrow pointing from data diode DR3 to data diode DR2

In addition, the data diode associated with a device can be installed within the device in question. In the example illustrated in FIG. 1, this is the case for data diode DR1 associated with device EQ1 and installed therein.

Conversely, the data diode associated with a device can be installed in the network NTW externally to the device in question. In the example illustrated in FIG. 1, this is the case for data diode DR2 associated with device EQ2 and installed in the network NTW externally thereto. The same is true for data diode DR3 associated with device EQ3 and installed in the NTW network, externally thereto.

In one or more embodiments, the data diode associated with a device comprises a photocoupler unidirectionally connecting two controllers. One of the controllers is located on the device side, while the other controller is located on the collection apparatus APP side or the aggregation node NA side.

In particular, a single device can integrate the endpoint controller of all data diodes of the aggregation node NA and of the collection apparatus APP.

The photocoupler, also called an opto-isolator, is an electronic component capable of transmitting a signal from one circuit to another without there being any galvanic contact between them. Typically, the photocoupler comprises a light emitting diode (better known by the acronym LED) combined with a phototransistor comprising an emitter, a base, and a collector. Electric current passes from the collector of the phototransistor to the emitter, provided that the base is receiving light (visible or infrared).

Of course, it is known to those skilled in the art that there are other types of data-diode-type equipment items functionally similar to the photocoupler described above and thus making it possible to render unidirectional a bidirectional connection.

Finally, as illustrated in FIG. 1, the network NTW may further comprise a switch CMT.

The switch CMT is configured to selectively activate or deactivate at least one data-diode-type equipment item in order to be able to reestablish, if necessary, a bidirectional connection between the device associated with the data-diode-type equipment item in question and the collection apparatus APP.

In the example described here, the switch CMT is configured to control data diode DR2 associated with device EQ2. Thus, the switch CMT can be used to deactivate data diode DR2 so that the connection between device EQ2 and the collection apparatus APP is again bidirectional. Once data diode DR2 is deactivated, it is then possible to transmit data originating from the collection apparatus, or originating from the aggregation node NA, to device EQ2. Similarly, it is then also possible to transmit data originating from another device among the plurality of devices, for example here devices EQ1 and EQ3, to device EQ2.

Such a switch CMT thus makes it possible to update or configure device EQ2. Restoring a bidirectional connection between device EQ2 and the collection apparatus APP or aggregation node NA also makes it possible to facilitate an intervention on device EQ2, especially in the event of a malfunction.

Of course, when the data diode associated with a device is installed within the device itself, as is the case for example for data diode DR1 associated with device EQ1, the switch CMT may also be integrated into the device concerned.

The invention has several advantages.

First of all, the invention allows improving the protection of data and the integrity of the various devices of a data collection network. Thus, when a device, for example a machine tool, is compromised by a malfunction or a malicious intrusion, the propagation of such an intrusion or of a virus is greatly limited by the presence of data-diode-type equipment items which prevent the retrieval of information or data from other devices or from the collection apparatus.

Furthermore, the distribution of information relating to know-how or to a trade secret, across the different devices of the plurality of devices of the network, makes it possible to improve their protection since such information cannot be transmitted to the corrupted device. Indeed, the presence of data-diode-type equipment items prevents the travel of such communication to the corrupted device. Thus, the distribution across a large number of devices contributes to rendering unusable the information extracted from a corrupted device.

The invention claimed is:

1. A device installed within a data collection network comprising a collection apparatus, the device being a data source of the data collection network selected from among a machine tool, a household tool, a residential gateway, connected robot, portable device of the Internet of Things, automated guided vehicle, a mixer or food processor, a connected washing machine and an electricity meter, the device being configured to generate data relating to itself, the device being connected to the collection apparatus using a communication network, the device being connected to the collection apparatus via a data-diode-type equipment item associated with the device, so that there are as many data-diode-type equipment items as there are devices within the data collection network, each data-diode-type equipment item being arranged to render unidirectional the connection between each device and the collection apparatus, in the direction from each device towards the collection apparatus so that there are as many data flows rendered unidirectional from each device towards the collection apparatus within the data collection network as there are devices, and at least one switch of the data collection network is configured to selectively activate or deactivate at least one of the data-diode-type equipment item in order to be able to reestablish, if necessary, a bidirectional connection between the device associated with the data-diode-type equipment item and the collection apparatus.

2. The device of claim 1, further comprising the associated data-diode equipment item.

3. An equipment item capable of receiving data generated by at least one device of a data collection network associated with at least one data-diode-type equipment item, so that there are as many data-diode-type equipment items as there are devices within the data collection network, the at least one device being a data source of the data collection network selected from among a machine tool, a household tool, a residential gateway, connected robot, portable device of the Internet of Things, automated guided vehicle, a mixer or food processor, a connected washing machine and an electricity meter, the at least one device being configured to generate data relating to itself, the at least one device being connected to the collection apparatus using a communication network, the data collection network comprising a collection apparatus, the equipment item capable of receiving data being connected to the at least one device via the at least one data-diode-type equipment item, the at least one data-diode-type equipment item being arranged to render unidirectional the connection between the at least one device and the collection apparatus, in the direction from the at least one device towards the collection apparatus so that there are as many data flows rendered unidirectional from each device towards the collection apparatus within the data collection network as there are devices and at least one switch of the data collection network is configured to selectively activate or deactivate at least one of the data-diode-type equipment item in order to be able to reestablish, if necessary, a bidirectional connection between the device associated with the data-diode-type equipment item and the collection apparatus.

4. The equipment item capable of receiving the data of claim 3, further comprising at least one aggregation node suitable for aggregating the data generated by the devices, the collection apparatus being suitable for collecting the data once the data have been aggregated by the aggregation node.

5. A data collection network comprising:
   at least one device, the device being a data source of the data collection network selected from among a machine tool, a household tool, a residential gateway, connected robot, portable device of the Internet of Things, automated guided vehicle, a mixer or food processor, a connected washing machine and an electricity meter, the at least one device being configured to generate data relating to itself, the at least one device being connected to the collection apparatus using a communication network, and
   a collection apparatus suitable for collecting data generated by the at least one device,
   the network further comprising at least one data-diode-type equipment item respectively associated with the at least one device, so that there are as many data-diode-type equipment items as there are devices within the data collection network, each device being connected to the collection apparatus via its associated data-diode-type equipment item, each data-diode-type equipment item being arranged to render unidirectional the connection between the each device and the collection apparatus, in the direction from the each device towards the collection apparatus so that there are as many data flows rendered unidirectional from each device towards the collection apparatus within the data collection network as there are devices, and
   the network further comprising at least one switch configured to selectively activate or deactivate at least one data-diode-type equipment item in order to be able to reestablish, if necessary, a bidirectional connection between the device associated with the data-diode-type equipment item and the collection apparatus.

6. The network of claim 5, comprising a plurality of devices and a plurality of data-diode-type equipment items, at least one device among the plurality of devices being connected to the collection apparatus via at least one among the plurality of data-diode-type equipment items.

7. The network of claim 5, further comprising an aggregation node connected to each device via the data-diode-type equipment item associated with the device, the aggregation node being suitable for aggregating the data generated by the devices, the collection apparatus being suitable for collecting the data once the data have been aggregated by the aggregation node.

8. The network of claim 5, wherein a data-diode-type equipment item associated with a device is installed within the device.

9. The network of claim 5, wherein a data-diode-type equipment item associated with a device is installed in the network externally to the device.

10. The network of claim 5, wherein the network is at least partly a wired network.

11. The network of claim 5, wherein the network is at least partly a wireless network.

12. The network of claim 5, wherein at least one device is a machine tool.

13. The network of claim 5, wherein at least one data-diode-type equipment item comprises a photocoupler unidirectionally connecting two controllers.

14. The network of claim 5, comprising a plurality of devices, wherein an operating process of one or more devices or a process for manufacturing a product by one or more devices includes a set of information distributed across devices among the plurality of devices.

15. The network of claim 5, further comprising at least one switch configured to selectively activate or deactivate at least one data-diode-type equipment item to reestablish a bidirectional connection between the device associated with the data-diode-type equipment item and the collection apparatus based on meeting a condition.

16. The network of claim 15, wherein the condition comprises a malfunction of the device associated with the data-diode-type equipment item.

17. A device installed within a data collection network comprising a collection apparatus, the device being a data source of the data collection network selected from among a machine tool, a household tool, a residential gateway, connected robot, portable device of the Internet of Things, automated guided vehicle, a mixer or food processor, a connected washing machine and an electricity meter, the device being configured to generate data relating to itself, the device being connected to the collection apparatus using a communication network, the device being connected to the collection apparatus via a data-diode-type equipment item associated with the device, so that there are as many data-diode-type equipment items as there are devices within the data collection network, wherein each device within the data collection network is connected to the collection apparatus via a respective data-diode-type equipment item, such that there are as many data-diode-type equipment items as there are devices, each data-diode-type equipment item rendering the connection between its respective device and the collection apparatus unidirectional from the device towards the collection apparatus and at least one switch of the data collection network is configured to selectively activate or deactivate at least one of the data-diode-type equipment item in order to be able to reestablish, if necessary, a bidirectional connection between the device associated with the data-diode-type equipment item and the collection apparatus.

* * * * *